(12) United States Patent
Zhang et al.

(10) Patent No.: US 11,667,576 B2
(45) Date of Patent: Jun. 6, 2023

(54) METHODS OF ENHANCING THE DEFORMABILITY OF CERAMIC MATERIALS AND CERAMIC MATERIALS MADE THEREBY

(71) Applicant: Purdue Research Foundation, West Lafayette, IN (US)

(72) Inventors: Xinghang Zhang, West Lafayette, IN (US); Haiyan Wang, West Lafayette, IN (US); Jin Li, West Lafayette, IN (US); Jaehun Cho, West Lafayette, IN (US); Xin Li Phuah, West Lafayette, IN (US); Han Wang, Richland, WA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/811,814

(22) Filed: Mar. 6, 2020

(65) Prior Publication Data

US 2020/0283342 A1  Sep. 10, 2020

Related U.S. Application Data

(60) Provisional application No. 62/843,406, filed on May 4, 2019, provisional application No. 62/815,738, filed on Mar. 8, 2019.

(51) Int. Cl.
| | |
|---|---|
| *C04B 35/48* | (2006.01) |
| *C04B 35/64* | (2006.01) |
| *C01G 23/08* | (2006.01) |

(52) U.S. Cl.
CPC .............. *C04B 35/48* (2013.01); *C01G 23/08* (2013.01); *C04B 35/64* (2013.01); *C01P 2002/90* (2013.01); *C01P 2004/03* (2013.01); *C01P 2004/04* (2013.01); *C04B 2235/3246* (2013.01);

(Continued)

(58) Field of Classification Search
CPC ... C04B 35/48; C04B 35/64; C04B 2235/549; C04B 2235/666; C04B 2235/3246
See application file for complete search history.

(56) References Cited

U.S. PATENT DOCUMENTS

| | | | |
|---|---|---|---|
| 2004/0038106 A1* | 2/2004 | Saito | G01N 27/4073 429/495 |
| 2005/0079971 A1* | 4/2005 | Nawa | C04B 35/119 501/105 |
| 2018/0072630 A1* | 3/2018 | Beaman | C04B 35/64 |

OTHER PUBLICATIONS

Cho, Jaehun, et al. "High temperature deformability of ductile flash-sintered ceramics via in-situ compression." Nature communications 9.1 (2018): 1-9. (Year: 2018).*

(Continued)

*Primary Examiner* — Karl E Group
*Assistant Examiner* — Cameron K Miller
(74) *Attorney, Agent, or Firm* — Hartman Global IP Law; Gary M. Hartman; Domenica N. S. Hartman

(57) ABSTRACT

Methods of determining and controlling the deformability of ceramic materials, as a nonlimiting example, YSZ, particularly through the application of a flash sintering process, and to ceramic materials produced by such methods. Such a method includes providing a nanocrystalline powder of a ceramic material, making a compact of the powder, and subjecting the compact to flash sintering by applying an electric field and thermal energy to the compact.

9 Claims, 10 Drawing Sheets
(8 of 10 Drawing Sheet(s) Filed in Color)

(52) U.S. Cl.
CPC .. *C04B 2235/549* (2013.01); *C04B 2235/666* (2013.01)

(56) References Cited

OTHER PUBLICATIONS

Cho, J. et al., "High Temperature Deformability of Ductile Flash-Sintered Ceramics via In-Situ Compression", Nature Communications; (2018); (pp. 1-9).
Cho, J. et al., "Study of Deformation Mechanisms in Flash-Sintered Yttria-Stabilized Zirconia by In-Situ Micromechanical Testing at Elevated Temperatures", Material Research Letters, (2019), vol. 7, No. 5, (pp. 194-202).
Li, J. et al., "Nanoscale Stacking Fault-Assisted Room Temperature Plasticity in Flash-Sintered TiO2", Science Advances (2019) (pp. 1-9).
Wang, H. et al., "Key Microstructural Characteristics in Flash Sintered 3YSZ Critical for Enhanced Sintering Process", Ceramics International (2019) 45 (pp. 1251-1257).
Wang, H. et al., "Staged Microstructural Study of Flash Sintered Titania", Materialia (2019) 8 (7 pages).

\* cited by examiner

METHODS OF ENHANCING THE DEFORMABILITY OF CERAMIC MATERIALS AND CERAMIC MATERIALS MADE THEREBY

CROSS REFERENCE TO RELATED APPLICATIONS

This application claims the benefit of U.S. Provisional Application Nos. 62/815,738 filed Mar. 8, 2019, and 62/843,406 filed May 4, 2019. The contents of these prior patent applications are incorperated herein by referece.

STATEMENT REGARDING GOVERNMENT FUNDING

This invention was made with government support under Contract No. N00014-17-1-2087 and N00014-16-2778 awarded by Office of Naval Research. The government has certain rights in the invention.

BACKGROUND OF THE INVENTION

The present disclosure generally relates to methods of increasing the deformability of ceramic materials, as a nonlimiting example, yttria-stabilized zirconia, particularly through flash sintering, and to ceramic materials produced by such methods.

This section introduces aspects that may help facilitate a better understanding of the disclosure. Accordingly, these statements are to be read in this light and are not to be understood as admissions about what is or is not prior art.

Ceramic materials have a variety of high temperature applications, including but not limited to thermal barrier coatings (TBCs) for high-thrust engines and turbines. Yttria-stabilized zirconia (YSZ) is commonly used as a TBC material because it offers one of the lowest thermal conductivities, about 2.3 W/mK at about 1000° C. Zirconia ($ZrO_2$) has a monoclinic phase [space group $P2_1/c$] at room temperature, and has a tetragonal phase [space group $P4_2/nmc$] that can be partially or fully stabilized by doping with various metal oxides, including yttria ($Y_2O_3$), ceria ($CeO_2$), and magnesia (MgO). The stabilizer content is often represented as a number preceding YSZ. Herein, the stabilizer content will be cited in molar percentage, for example, 3YSZ will refer to zirconia stabilized by 3 mol % yttria.

The discovery of martensitic phase transformation (from tetragonal to monoclinic phase) in $ZrO_2$ has led to significant investigations on its deformability. The volume expansion (about 4%) during martensitic phase transformation near crack tips induced by external stresses can introduce compressive stress that in turn can retard crack propagation. Therefore, YSZ provides new opportunities for various applications, including reliable thermal and environmental barrier coatings, solid oxide fuel cells, and shape memory devices, just to name a few.

A majority of ceramic materials possess high strength but low toughness at low temperature due to the lack of dislocation enabled deformability. Certain nanostructured ceramic materials have shown high strength, wear resistance and/or fracture toughness at elevated temperatures. However, conventional sintering typically requires very high temperature and long sintering time, and thus leads to significant grain coarsening. Recently, it has been discovered that YSZ can be fully densified within a few seconds at a temperature much lower than conventional sintering temperatures by a sintering technique referred to as flash sintering, which enables the retention of nanograins and enhanced dielectric properties. Flash sintering occurs by applying a ramp heating process at a constant heating rate under moderate electrical fields. Once the temperature is above the onset of the flash temperature, under an applied electrical field, a densification process takes place within a few seconds as evidenced by a sudden increase of electrical conductivity, accompanied with drastic increase in mass density.

Prior studies on the mechanical behaviors of YSZ have shown superelasticity and shape memory effect at room temperature. However, understanding of the mechanical behaviors of small scale YSZ specimens at elevated temperatures remains limited. Recently, research has shown that microcompression tests on small specimens can be carried out at an elevated temperature (about 500° C.) by heating the sample stage and indenter tip without a significant mechanical and thermal drift (about 1 nm/s). High-temperature micropillar compression techniques enable studies of temperature dependent deformation mechanisms for brittle materials at elevated temperatures. However, determining and controlling the deformability of flash-sintered ceramic materials is largely unknown despite an intriguing microstructure, including the generation of a large number of charged defects during the flash sintering process.

Thus, there is an ongoing desire to determine and control the deformability of flash-sintered ceramic materials, including but not limited to YSZ.

BRIEF DESCRIPTION OF THE INVENTION

The present invention provides methods of determining and controlling the deformability of ceramic materials, as a nonlimiting example, YSZ, particularly through the application of a flash sintering process, and to ceramic materials produced by such methods.

According to one aspect of the invention, a method of increasing the deformability of a ceramic material includes providing a nanocrystalline powder of a ceramic material, making a compact of the powder, and subjecting the compact to flash sintering by applying an electric field and thermal energy to the compact.

Another aspect of the invention is a ceramic material produced by a process comprising the steps described above.

Technical effects of methods and ceramic materials as described above preferably include the ability to produce ceramic materials, including but not limited to YSZ, with enhanced deformability.

Other aspects and advantages of this invention will be appreciated from the following detailed description.

BRIEF DESCRIPTION OF THE DRAWINGS

Some of the drawings shown herein may include dimensions. Further, some of the drawings may have been created from scaled drawings or from photographs that are scalable. It is understood that such dimensions or the relative scaling within the drawings are by way of example, and are not to be construed as limiting. It should be recognized that all the figures shown are not to scale.

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
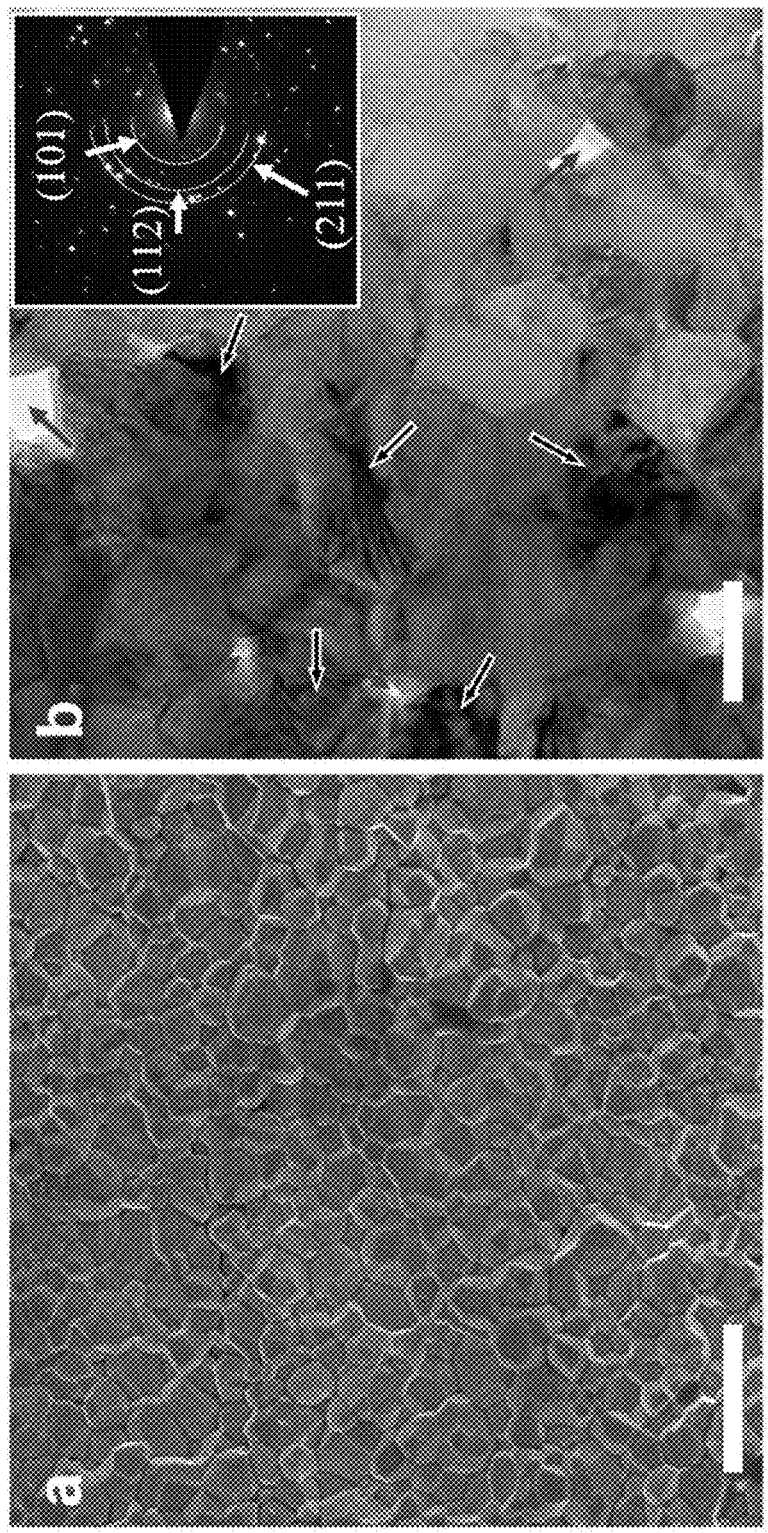
FIG. 1, Image (a), is an SEM image showing the microstructure of an unpolished flash-sintered 3 YSZ specimen. The average particle size is about 1 μm, and the scale bar is 3 μm. Image (b) is a bright-field TEM micrograph of the flash-sintered 3YSZ specimen showing subgrains with grain boundaries and defects generated during flash sintering (labeled by black arrows) and nanopores (about 1.4%) (indicated by red arrows). The inserted SAD pattern shows diffraction rings. Scale bar, 200 nm. Image (c) is a STEM micrograph showing a dislocation array inside a grain in the flash-sintered 3YSZ specimen. The dislocation array was generated in a bottleneck region of the grain as indicated by red arrows. Scale bar, 100 nm. Images (d) and (e) are bright-field (BF) and dark-field (DF) TEM micrographs showing the dislocation array in the boxed region of Image (c). Scale bar, 50 nm. Images (f)-(i) contain BF TEM images of the flash-sintered 3YSZ specimen showing the existence of dislocations and dislocation arrays in grains. Scale bar, 50 nm.
Figure 1:
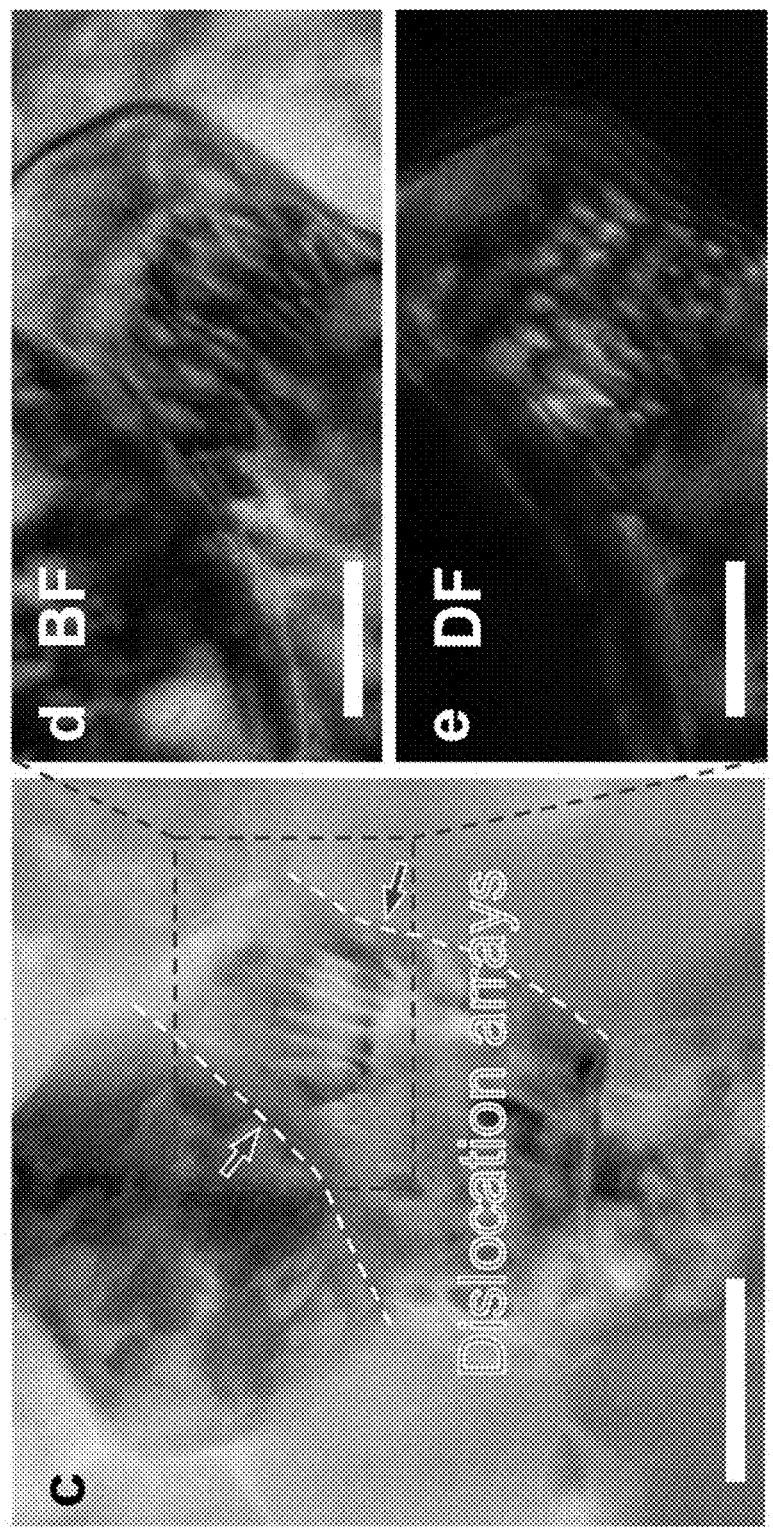
Figure 1:
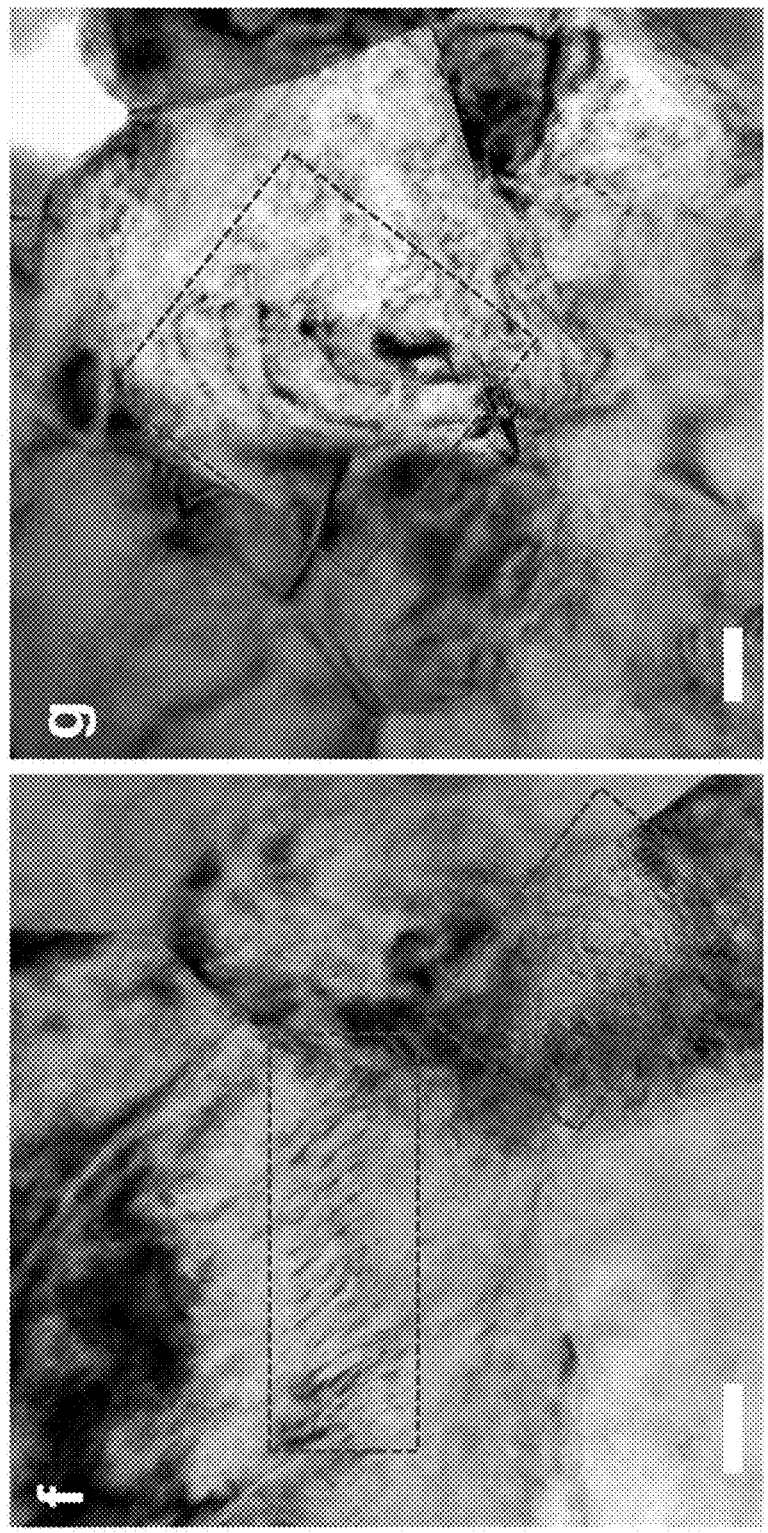
Figure 1:
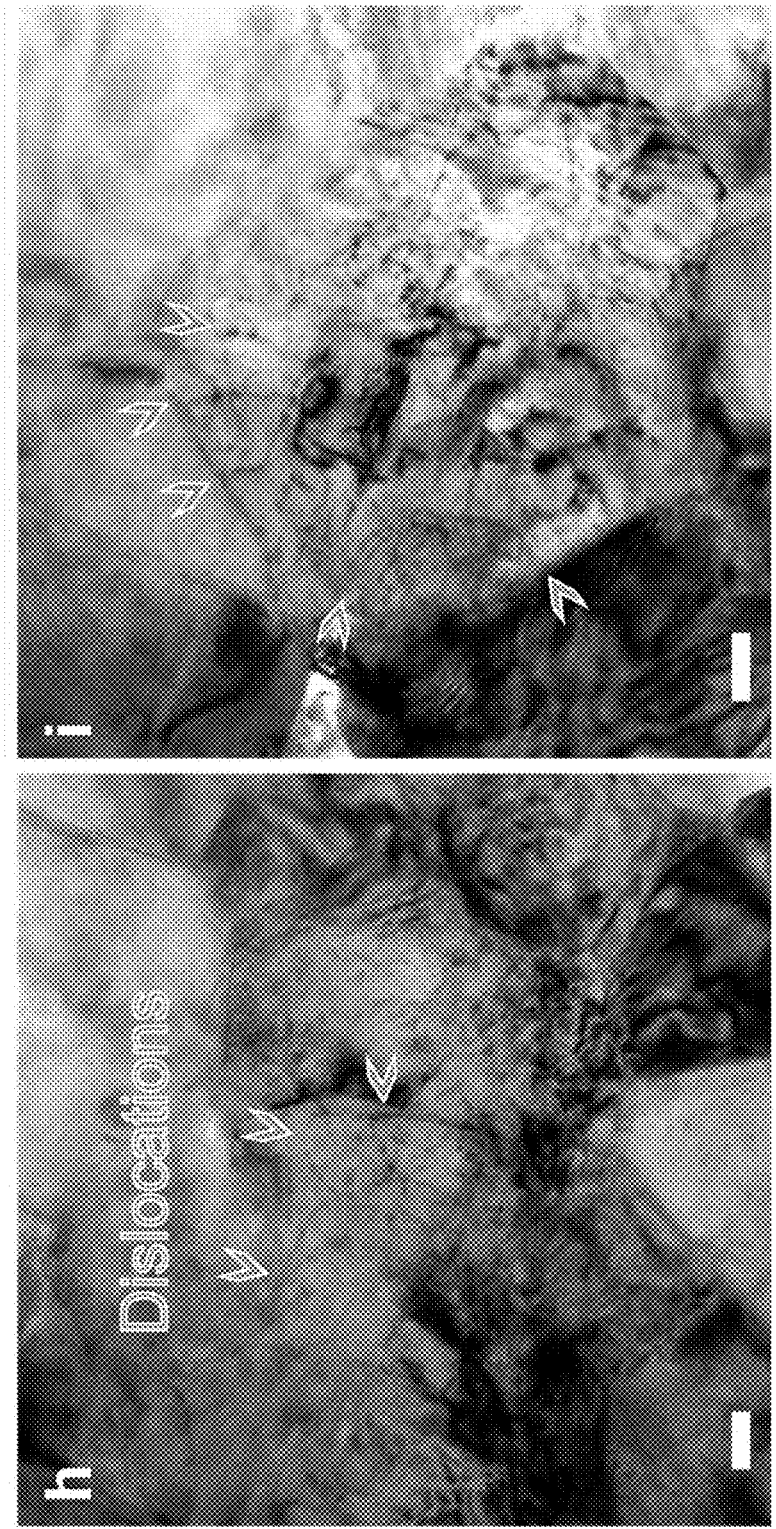

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Flash sintering has attracted significant attention lately as its remarkably rapid densification process at low sintering furnace temperature leads to the retention of fine grains and enhanced dielectric properties. However, high temperature mechanical behavior of flash-sintered ceramic materials remain poorly understood. In this disclosure, approaches and methods to improving the plasticity of sintered ceramic materials are described. Also discussed are high temperature (up to 600° C.) in situ compression studies on flash-sintered yttria-stabilized zirconia (YSZ). Below 400° C., YSZ exhibits high ultimate compressive strength exceeding 3.5 GPa and high inelastic strain (about 8%) due primarily to phase transformation toughening. At higher temperatures, crack nucleation and propagation are significantly retarded, and prominent plasticity arises mainly from dislocation activity. The high dislocation density induced in flash-sintered ceramic materials may have general implications for improving the plasticity of sintered ceramic materials. This disclosure also reports in situ micropillar compression studies on the deformability of a flash-sintered 3 mol % yttria stabilized zirconia (3YSZ) at elevated temperatures (up to 600° C.). The flash-sintered 3YSZ contained abundant dislocations. The mechanical behaviors of the flash-sintered 3YSZ were highlighted by increased plasticity, and a temperature-dependent transition of deformation mechanism.

Methods and materials employed in the investigations are described below. Experimental results and a discussion of several aspects of the invention are then described.

Flash sintering was performed on a custom-modified thermomechanical testing system (SETSYS Evolution, SETARAM Instrumentation). Specimens with a diameter of 5 mm and a thickness of 2 mm were prepared by using commercially available 3YSZ (TZ-3Y-E, Tosoh Corp., 40 nm particle size) were sandwiched between two platinum electrodes. An alumina rod was utilized to apply minimum pressure (a few kPa) to ensure rigid contact between the electrodes and sample. A DC power of various voltage was applied to achieve an electric field of 1.5, 15, and 150 V/cm with a constant heating rate of 25° C./min (maximum temperature was set to 1300° C.). The experiment was performed in the presence of air. After the onset of flash, the system was switched from the voltage control mode to a current control mode. The experiment was terminated immediately after switching to current control mode to prohibit grain growth. The linear shrinkage of the samples was measured by a dilatometer.

TEM sample preparation. Plan-view TEM samples of flash-sintered 3YSZ were prepared through the conventional approach, which included manual grinding, polishing, dimpling and final polishing in an ion milling system (PIPS II, Gatan). Low energy ion polishing (2 kV) was used to minimize ion milling-induced damage. An FEI Talos 200X TEM/STEM with Chemi STEM technology (X-FEG and SuperX EDS with four silicon drift detectors) operated at 200 kV was used in this study for microstructure characterization and energy-dispersive X-ray spectroscopy (EDS) chemical mapping.

Microcompression test. Compacts of flash-sintered 3YSZ, in the form of micropillars having diameters of about 3 μm and a diameter-to-height aspect ratio of 1:3-1:2, were prepared using focused ion beam (FEI quanta 3D FEG) and a series of concentric annular milling and polishing with progressively de-escalated currents were adopted to reduce tapering angle. Micropillar compression experiments were performed using a Hysitron PI 87 R PicoIndenter equipped with a piezoelectric actuator on a capacitive transducer that enabled the collection of force-displacement data inside a scanning electron microscope (FEI quanta 3D FEG). Moreover, a 20 μm diamond flat punch tip designed for high temperature compression experiments was used to conduct in situ compression experiments and the geometric variation of micropillars was synchronized to an evolving force-displacement curve. For high temperature in situ compression setups, the flat punch was fastened to probe heater and the specimens were clamped by a V-shaped molybdenum to a ceramic heating stage. The temperatures on two heating terminals were simultaneously ramped up at a rate of 10° C./min and isothermally preserved for 30 minutes before implementing every single compression experiment to eliminate thermal-driven drifts on both probe and stage sides. An average drift rate of 0.2-0.5 nm/s was estimated in the preloading process for 45 seconds and the estimated force noise level was less than 8 μN prior to compression. An overestimation of specimen displacement during the compression test induced by a displacement associated with the measuring instrument (machine compliance) was systematically measured during in situ SEM studies and corrected.

Finite element analysis. A polycrystalline microstructure with three different grain orientations was subjected to a compression of −200 MPa in the in-plane vertical direction, while the bottom boundary was fixed, and the out-of-plane state of stress was set to plane strain conditions. Material properties are summarized in Table 1. Assigned Euler angle orientations are, for the bottom grain, $(\alpha, \beta, \gamma)=(0, 0, 0)$, for the top-right grain, $(\alpha, \beta, \gamma)=(0, 45, 0)$, and for the top-left grain, $(\alpha, \beta, \gamma)=(45, 45, 0)$. Euler angle operations were: first rotate angle β degrees about the z-axis, then rotate α degrees about the y-axis, and finally rotate γ degrees about a new z-axis. The mechanical equilibrium state of the polycrystalline was solved using OOF2[52], an open source implementation of the finite element method. The relative numerical tolerance was set to $1\times10^{-10}$. The simulation used 40 GB of RAM and a wall time of approximately 4 hours.

TABLE 1

Elastic properties of tetragonal zirconia

| $C_{11}$ (GPa) | $C_{12}$ (GPa) | $C_{13}$ (GPa) | $C_{33}$ (GPa) | $C_{44}$ (GPa) | $C_{66}$ (GPa) |
|---|---|---|---|---|---|
| 395 | 26 | 105 | 326 | 42 | 56 |

Results of the experiments leading to this disclosure are described below.

Microstructural characterization. 3YSZ (TZ-3Y-E, Tosh corp., 40 nm) was heated in a thermomechanical analyzer with platinum electrodes at a constant heating rate of 25° C./min under an electrical field of 150 V/cm. Ultra fast densification occurred at a furnace temperature of 1150-1200° C. in a few seconds, which is significantly lower compared to conventional sintering temperature of about 1900° C. required to sinter 3YSZ in a few seconds. The applied heat and electrical field were removed immediately after the onset of flash sintering to prevent grain growth. Even though the densification process of 3YSZ occurred at relatively low temperatures, X-ray diffraction pattern showed a dominant tetragonal phase without evident monoclinic and cubic phases. Energy dispersive spectroscopy revealed that zirconium and yttrium were uniformly distributed throughout the grains, and zirconium was slightly deficient along grain boundaries. FIG. 1, Image (a), shows a scanning electron microscopy (SEM) image of an unpolished flash-sintered 3YSZ. An average grain size of 870 nm was determined by a systematic grain intercept method. However, a bright-field transmission electron microscopy (TEM) micrograph revealed the existence of subgrains as shown in FIG. 1, Image (b). The average subgrain size was 159 nm. The flash-sintered 3YSZ was densified to 98% of theoretical density with nanopores indicated by red arrows in FIG. 1, Image (b). Black arrows in Image (b) indicate internal defects in grains generated during the flash sintering process. Deformation twinning, which is frequently observed in bulk tetragonal zirconia, was rarely observed in this study, which may be due to the ultra fine grain sizes.

Preexisting dislocations. Many of the defects in the grains were identified to be high-density dislocation networks. Furthermore, scanning TEM (STEM), bright-field and dark-field TEM micrographs in FIGS. 1c, 1d and 1e show an array of dislocations inside a grain. Also, the dislocation arrays were observed frequently in the flash-sintered 3YSZ as can be seen in bright-field TEM micrographs in FIG. 1, Images (f)-(i). 3YSZ synthesized at lower electric fields (1.5 V/cm and 15 V/cm) and at the same heating rate (25° C./min) were also prepared to study the effect of electric field on the dislocation generation. Relative densities of 78 and 85% were achieved for the 1.5 and 15 V/cm specimens, respectively. The grain intercept method revealed average grain sizes of 59±7 and 57±9 nm for 3YSZ sintered under 1.5 and 15 V/cm, respectively. The TEM studies revealed little dislocations or dislocation arrays in these specimens.

Figure 2:
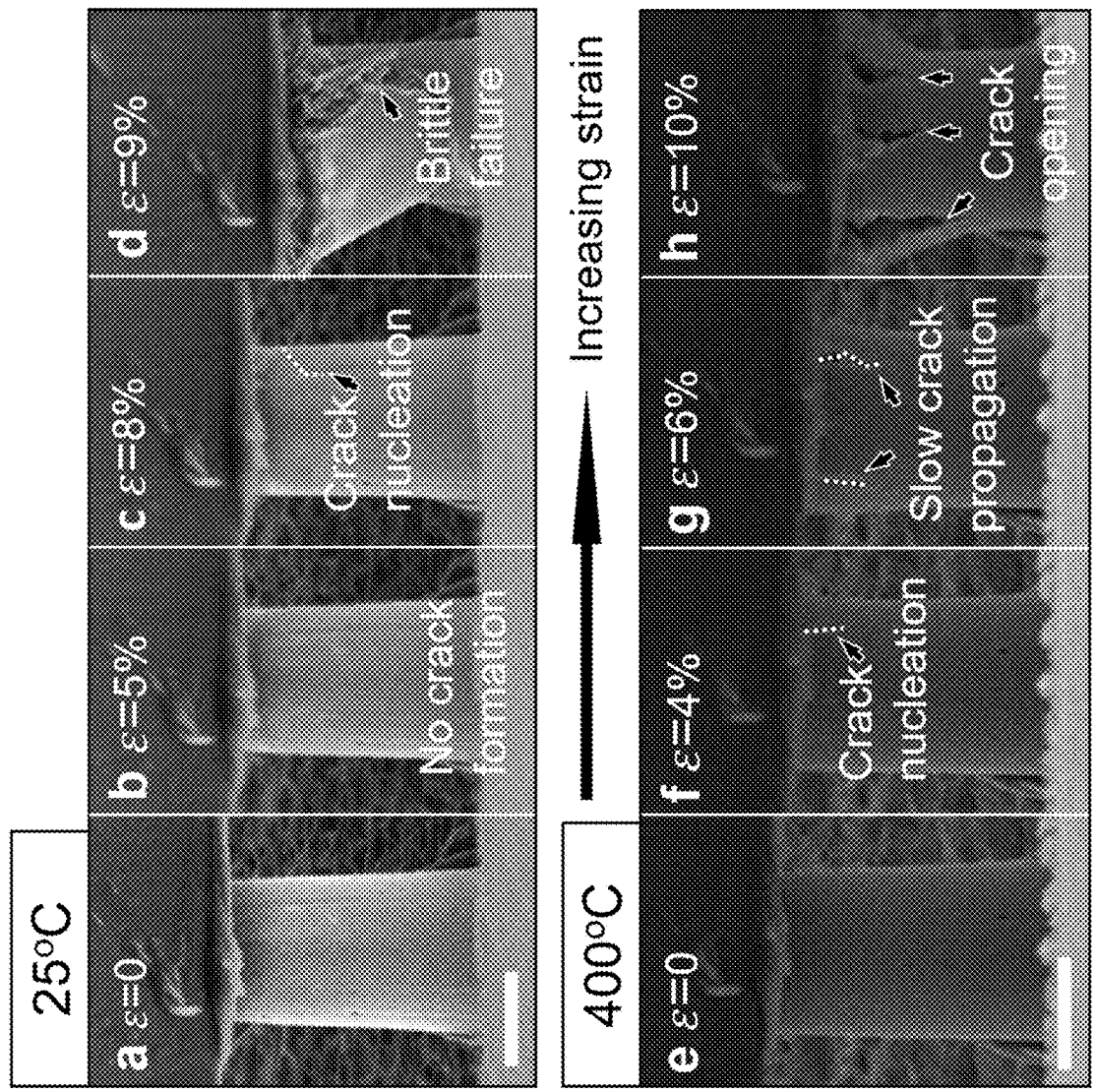
FIG. 2 contains SEM images showing uniaxial in situ microcompression tests on the flash-sintered 3YSZ specimen conducted at room temperature and at 400° C. at a constant strain rate of $5 \times 10^{-3}$ s$^{-1}$. Images (a)-(d) are SEM images during in situ compression test of micropillars at different strain levels at 25° C. No cracks are detected until a true strain of 8%. The micropillar strained to 9% experienced brittle catastrophic fracture. Scale bar, 2 μm. Images (e)-(h) show micropillars tested at 400° C., in which cracks nucleated at smaller strain, about 4%. Crack density increased with compressive strain. However, cracks propagated downward gradually and slowly without catastrophic failure. Scale bar, 2 μm. Image (i) as the corresponding true stress-strain curve showing that the flow stress exceeded 3.5 GPa for micropillars tested at 25° C. In comparison, the micropillar tested at 400° C. had a flow stress of 2 GPa and higher elastic modulus.
Figure 2:
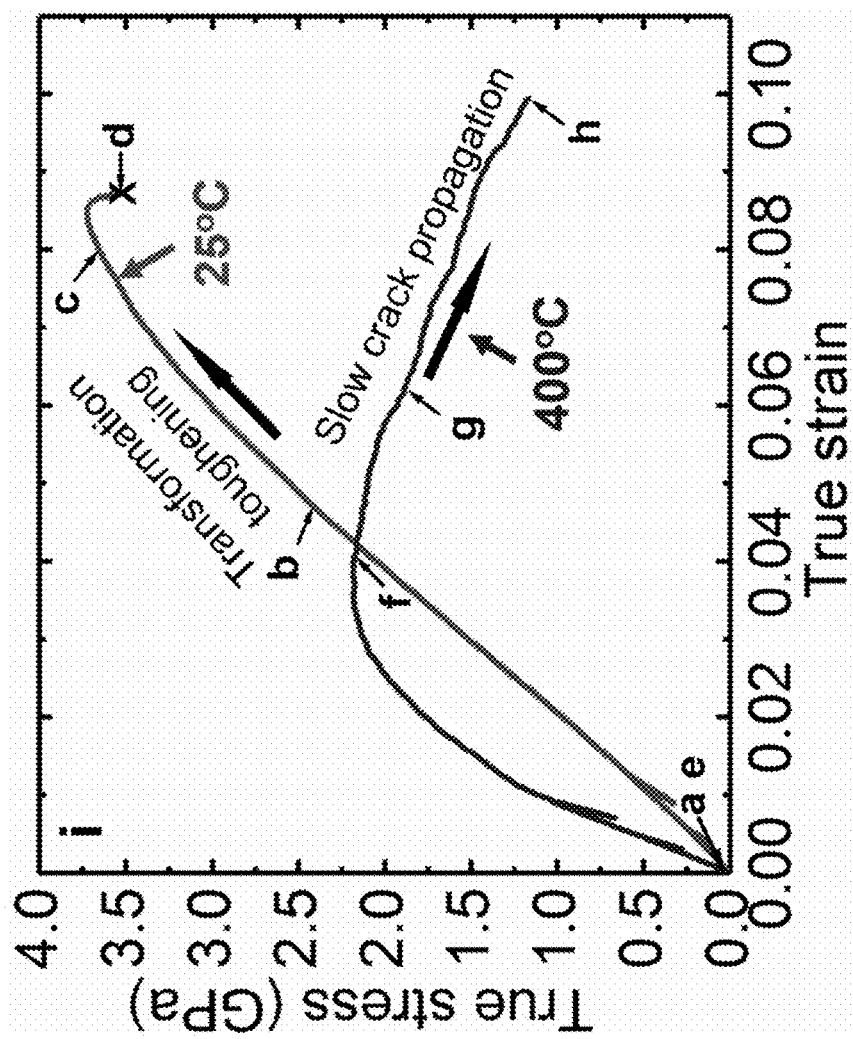

In situ microcompression tests. Micropillars 3 μm in diameter and 6 μm in height were fabricated using a focused ion beam (FIB) technique on the flash-sintered 3YSZ. Taking into consideration the average subgrain size of the specimen, about 160 nm, each micropillar contained more than 5,000 subgrains. Thus, the mechanical behaviors of the micropillars were a good representation of a large number of grains. Uniaxial in situ microcompression tests on the micropillars were carried out from room temperature to 600° C. at a constant strain rate of $5\times10^{-3}$ $s^{-1}$ inside an SEM microscope with partial unloading at strains of 0.5 and 1%, to evaluate the apparent elastic modulus at each test temperature. FIG. 2 shows snapshots of SEM images taken during the in situ compression tests of micropillars at different strain levels at room temperature and 400° C. Micropillars compressed at room temperature sustained a strain of up to 8% without crack formation, and then experienced brittle catastrophic fracture at a strain of about 9%. For micropillars tested at 400° C., cracks nucleated at smaller strain, about 4%, and a greater crack density was observed compared to the specimens tested at room temperature. Meanwhile, cracks propagated downward gradually along the axial (loading) direction, but no catastrophic failure was observed. FIG. 2, Image (i) shows that the maximum flow stress exceeded 3.5 GPa in specimens tested at room temperature; whereas the peak stress reached 2 GPa for specimens tested at 400° C. at a true strain of 4%, and the stress decreased thereafter.

Figure 3:
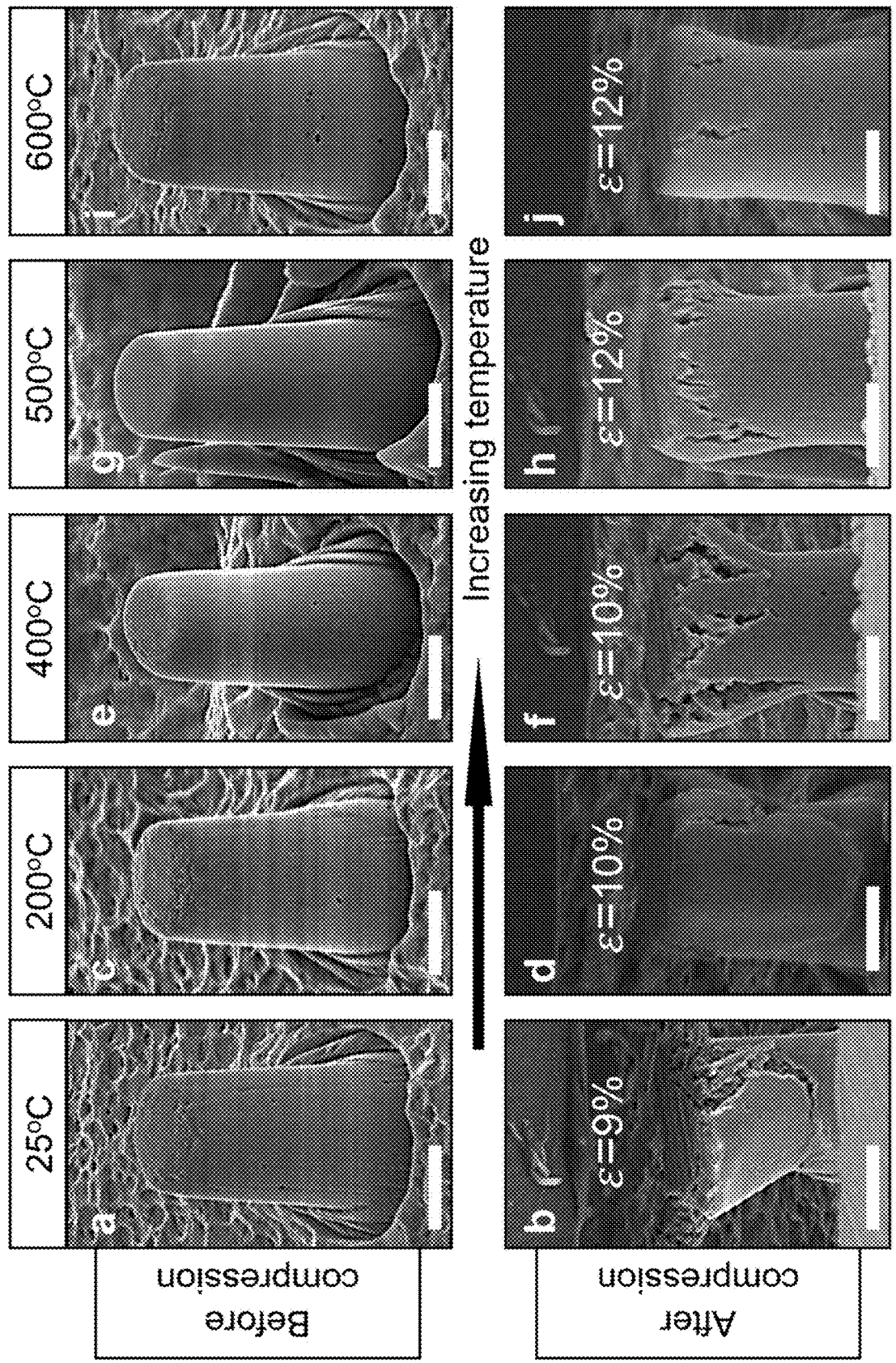
FIG. 3 shows SEM images of the flash-sintered 3YSZ micropillars before and after compression tests over a range of 25° C. to 600° C. and corresponding mechanical properties. Images (a)-(d) show micropillars that were tested at 200° C. and below and fractured in a brittle manner (into two major sections) at very large true strain. Scale bar, 2 μm. Images (e)-(j) show micropillars that were tested at 400 to 600° C. and exhibited multiple cracks that formed and propagated slowly into the micropillars, leading to formation of cauliflower-type micropillar tops. At 600° C., crack density and propagation distance were substantially reduced. Scale bar, 2 μm. Image (k) contains the corresponding true stress-strain curves of micropillars tested at different temperatures. Black arrows indicate the ultimate compressive strength (UCS) of the micropillars. Partial unloading at 0.5 and 1% strains were performed to investigate the apparent elastic moduli of micropillars tested at different temperatures. Ultimate compressive strength (UCS) decreased monotonically with increasing test temperature. The elastic modulus increased with test temperature up to 400° C. and decreased thereafter. Meanwhile, the critical strain at which the first crack nucleation took place decreased with temperature to a minimum of 4.5% strain at 400° C. and increased thereafter to 7.5% when tested at 600° C. 400° C. was the onset temperature where a different inelastic deformation mechanism began to operate. Zone 1 represents phase transformation toughening from room temperature to 400° C. Zone 2 corresponds to dislocation creep dominant plasticity above 400° C.
Figure 3:
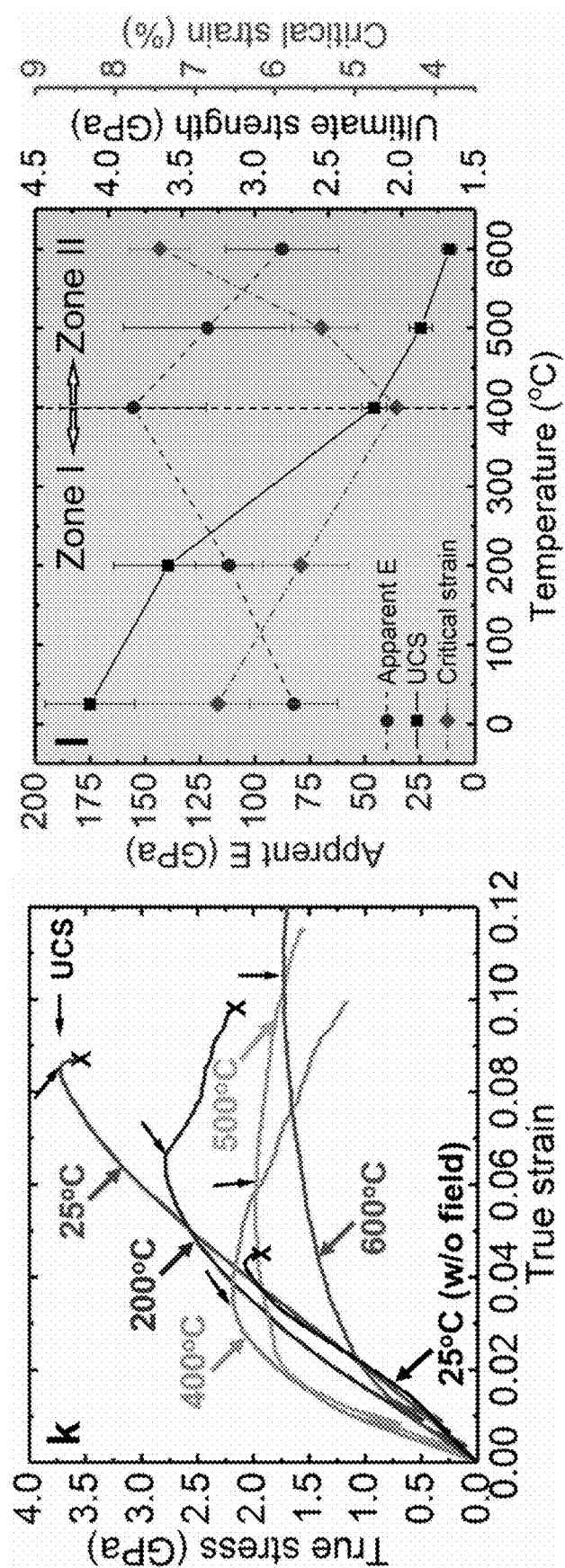

Temperature dependence of deformation mechanisms. FIG. 3, Images (a)-(j), compare SEM images of flash-sintered 3YSZ micropillars before and after microcompression tests at various temperatures. These images show that 400° C. was a fiducial temperature at which fracture mechanisms changed drastically. At 25 and 200° C., the micropillars, though they sustained a large strain, fractured in a brittle (catastrophic) manner. On the other hand, when tested between 400 and 600° C., multiple cracks initiated and propagated from the top surface down into the micropillars, leading to the formation of cauliflower morphologies at the top of the micropillars (FIG. 3, Images (f), (h), and (j)). As the test temperature rose, a prominent decrease of crack density and propagation was observed, implying that a new deformation mechanism began to govern the inelastic behavior of the micropillars at 400° C. and beyond. FIG. 3, Image (k), compares corresponding stress-strain curves of micropillars tested at different temperatures with black arrows, indicating the ultimate compressive strength (UCS) of the micropillars. Five true stress-true strain curves were obtained for reproducibility tests at each temperature. The UCS of the flash-sintered 3YSZ decreased monotonically with increasing test temperature as shown in FIG. 3, Image (l). However, elastic modulus (measured from a series of partial unloading experiments) first increased with test temperature up to 400° C. and decreased thereafter. The critical strain for the nucleation of cracks decreased with increasing test temperature, reached a minimum at 400° C., and then increased to about 7.5% at 600° C. Meanwhile, 3YSZ was also sintered without an electric field at a constant heating rate of 25° C./min to 1300° C. and exhibited a failure stress of 2 GPa and a failure strain of 4%. Martensitic transformations. TEM experiments were carried out on the YSZ micropillars tested after microcompression tests at room temperature. One of the micropillars was determined to have fractured at a flow stress of about 4 GPa and a strain of about 6%. Numerous grains in the vicinity of the fracture surface were examined carefully. The diffraction pattern of one grain was observed along the [$\bar{1}$01] zone axis and indexed to be a monoclinic phase (JCPDS #37-1484). The interplanar spacing of the (111) plane was measured to be 0.279 nm, consistent with the theoretical value of 0.284 nm. Two additional grains were examined along respective zone axis of [1$\bar{3}$2] and [$\bar{1}$12] and indexed to be monoclinic zirconia phase. These studies showed that the tetragonal-to-monoclinic phase transition indeed takes place during the compression tests.

Figure 4:
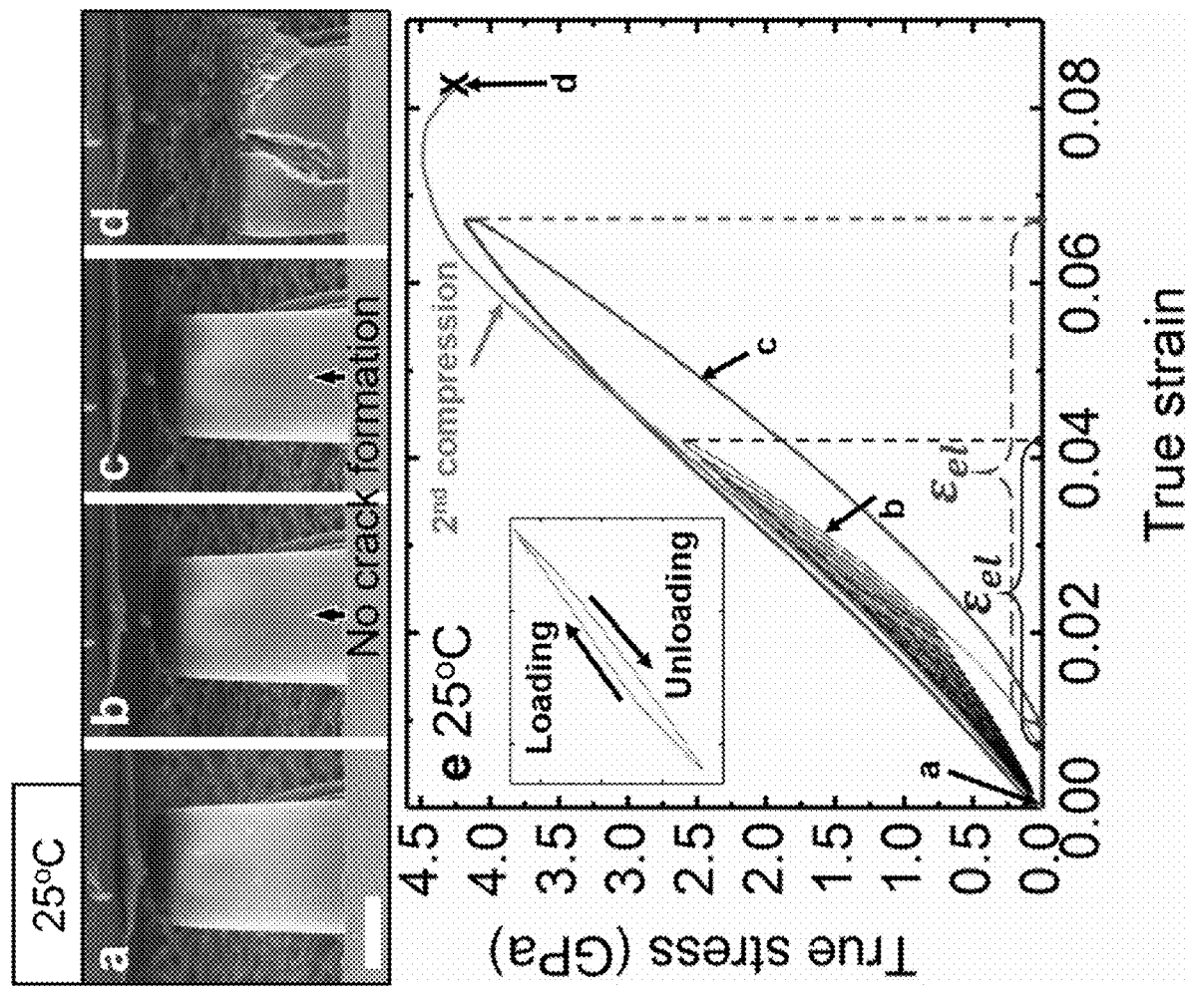
FIG. 4 contains cyclic loading that followed monotonic compression tests at a strain rate of $5 \times 10^{-3}$ s$^{-1}$ at 25° C. and 400° C. and the corresponding stress-strain curves. Images (a) and (f) are SEM images of micropillars before cyclic loading tests. Scale bar, Images (b) and (g) are SEM micrographs of micropillars after 30 cyclic loading tests. The cyclic stress-strain curves are shown as blue curves in Images (e) and (i). Images (c) and (h) are SEM images of micropillars after the first monotonic compression tests highlighted in red curves. Image (d) is an SEM micrograph after the second monotonic compression test highlighted in green. The 27th loading-unloading curves at each temperature shown in orange color and enlarged in the inserted stress-strain curves clearly show the hysteresis loops. The upper portion of a loading-unloading curve is enlarged in a circle to illustrate the stress relaxation for 1 second of holding at 400° C.
Figure 4:
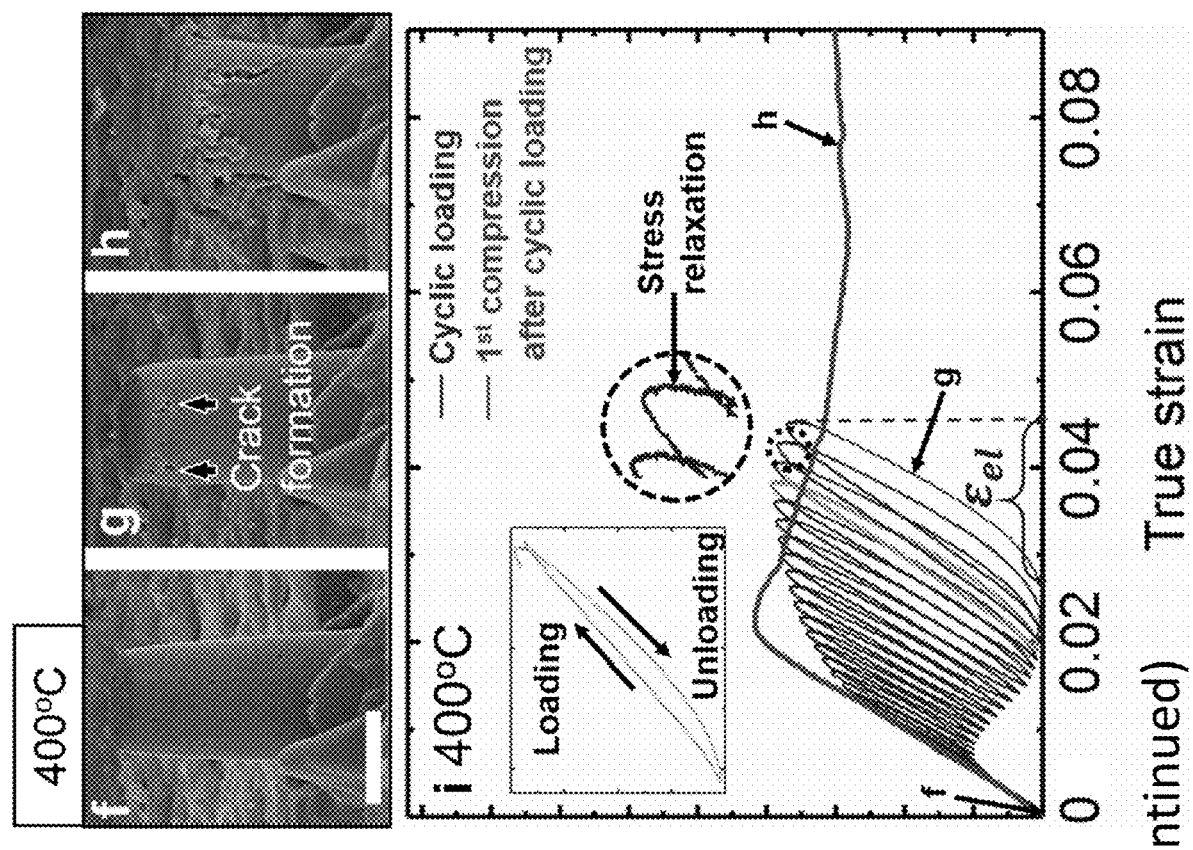

Cyclic loading tests. Thirty cyclic loading and partial unloading tests were carried out at a strain rate of $5 \times 10^{-3}$ s$^{-1}$ at room temperature and 400° C. as shown in FIG. 4. Holding segments prior to unloading for one second (during which displacement remains constant) were added. First, thirty cyclic loadings (with increasing strain in each cycle) up to a strain of 4% were conducted with partial unloading to half of the maximum applied strain in each cycle in order to maintain a solid contact between the diamond tip and micropillar. No cracks were observed for the specimen tested at room temperature during the cyclic tests, and the micropillar exhibited a significant amount of recoverable strain during unloading (FIG. 4, Image (b)). After cyclic testing, a monotonic compression test (highlighted by a red curve in FIG. 4, Image (e)) was conducted on the same micropillar up to a strain of 7%. The micropillar exhibited 6% recoverable and 1% irrecoverable strain without cracking (FIG. 4, Image (c)). The same micropillar experienced a catastrophic failure in a succeeding monotonic compression test (FIG. 4, Image (d)) at a strain of 8% (shown by a green curve in FIG. 4, Image (e)). In comparison, the specimen subjected to cyclic loading tests at 400° C. (FIG. 4, Image (i)) showed much less recoverable strain than that tested at room temperature. Also, small cracks formed (as shown in FIG. 4, Image (g)) at a strain of 4% during the cyclic loading test. The subsequent monotonic microcompression test on the same micropillar, highlighted as a red curve in FIG. 4, Image (i), showed that the micropillar exhibited a UCS of 2 GPa, and a residual strength of 1.5 GPa at a strain of 9%, and multiple cracks formed after compression tests (FIG. 4, Image (h)).

In general, dislocations are rare in ceramic materials as the strong covalent and ionic bonding greatly discourage the formation of dislocations in ceramic materials. However, the TEM studies reported above showed ample evidence for the formation of high-density dislocations in flash-sintered 3YSZ. Also, dislocation arrays are frequently observed near triple junctions. It is likely that a large stress concentration (gradient) developed near triple junctions during the rapid grain growth process. Significant mass (atomic) transport occurred during the flash sintering process to fill in the voids between grains/particles during a very short sintering time (several seconds). The high rate (4-5 orders of magnitude faster than conventional sintering) of mass transport and flow near triple junctions may lead to substantial plastic deformation (enabled by high-density dislocation arrays as shown in FIG. 1, Image (c)) during flash sintering. This assertion coincides with the TEM studies of 3YSZ sintered under 1.5 and 15 V/cm, which displayed insignificant grain growth and little dislocations. Rapid grain growth and a large electric field may play a significant role in producing dislocations and their arrays by generating the internal stress during flash sintering. Electric fields of 1.5 and 15 V/cm for flash-sintering 3YSZ were insufficient to induce dislocations. Interestingly, intragranular dislocations and dislocation entanglement in 3YSZ have been observed at ultra-high temperature, 1400° C. during tensile creep tests at 50 MPa. In the current study, the generation of intragranular dislocations, their arrays and entanglement near triple junctions may strongly depend on stress and high strain rate plastic flow during flash sintering. Shear stresses allowing dislocation pile-up in 3YSZ range from 350 to 1260 MPa based on the lattice dislocation pile-up model:

$$\tau = \frac{Gb}{2L} \tag{1}$$

where G is the shear modulus, b is the Burgers vector, N is the number of intragranular dislocations in the pile-up within a grain, and L is the length of dislocation pile-ups. From TEM measurements on dislocation separation distances in the pile-ups, about 20 nm, in flash-sintered 3YSZ, the shear stress during flash sintering was estimated to be about 1230 MPa (by taking G=65 GPa and b for <110> type lattice dislocation=3.6×10$^{-10}$ µm), which was within the range that can form dislocation arrays in 3YSZ at elevated temperatures during flash sintering. The dislocation density in many grains reaches as high as 2 to 3×10$^{12}$ m$^{-2}$, compared to the typical density of about 10$^8$ to 10$^{10}$ m$^{-2}$ in a majority of ceramic materials. These high-density dislocations played a vital role on the deformability of the flash-sintered 3YSZ tested at elevated temperatures. It is well known that dislocation glide is unlikely to take place in bulk ceramic material at room temperature unless applying a confinement pressure via hydrostatic or gaseous medium. However, at microscales, plastic deformation of certain ceramic materials by glide of dislocations has been observed. It has been speculated that, based on the plasticity of conventionally sintered YSZ at small scales at room temperature, dislocation activity along with transformation induced-plasticity at a higher stress level (without showing direct evidence of dislocations) may be a possible inelastic deformation mechanism for YSZ. The finite element method analysis reported herein on stress distribution for dislocations in polycrystalline YSZ further supports this theory and shows that shear stress concentration near grain boundaries and triple junctions induces the nucleation and migration of dislocations, thereby enhancing plastic deformation of YSZ.

A strain of about 8% for stabilized zirconia owing to martensitic transformation-induced plasticity has been previously reported. However, micropillars exhibiting such a large strain were often limited to single and oligocrystalline structures to minimize internal mismatch stresses during martensitic transformation. The micropillars of the flash-sintered 3YSZ consist of subgrains, about 160 nm in diameter, much smaller than the diameters of the micropillars (3 µm). Thus, the large (about 8%) inelastic flow may arise from not only transformation induced-plasticity but also dislocation activity especially at higher stress level.

For micropillars tested at 400° C., cracks nucleated at smaller strain, about 4%, due to the lack of martensitic transformation toughening. At elevated temperatures, the metastable tetragonal phase began to thermally transform into stable tetragonal and cubic phase, degrading the deformability of the flash-sintered 3YSZ by transformation toughening. However, at 400° C., cracks initiated from the top surface of the micropillar, propagated downward gradually and slowly without catastrophic failure, unlike the brittle catastrophic fracture of micropillars tested at room temperature. The prominent variation of fracture morphology of the deformed micropillars implied that a new inelastic deformation mechanism superseded martensitic transformation toughening as temperature rose. In the conventionally sintered bulk YSZ system, it is known that the 700 to 800° C. temperature range favors other mechanisms (grain boundary sliding, ferroelastic domain switching and/or dislocation activity) as a substitute to martensitic transformation. However, the flash-sintered YSZ contained nanograins, oxygen vacancies and abundant preexisting dislocations, which may have resulted in the early activation of other inelastic deformation mechanisms at 400° C. It is worth mentioning that the critical strain for the micropillars compressed at 200° C. was still high (about 6%). Catastrophic failure of micropillars was also observed for specimens tested at 200° C., and transformation toughening-induced plasticity remained the dominant inelastic deformation mechanism of the flash-sintered 3YSZ.

At an even greater test temperature, the martensitic phase transformation toughening was gradually replaced by the activation of a new inelastic deformation mechanism. Basically, the critical strain at which the first crack occurred decreased with increasing test temperature and reached a minimum at about 400° C., as can be seen in FIG. 3, Image (i). The earlier occurrence of cracks at an elevated temperature (at lower critical strain than that at room temperature) implied a lack of transformation toughening. The critical strain for the onset of crack propagation increased when the test temperature was greater than 400° C. Furthermore, in contrast to the crack triggered catastrophic failure in low temperature specimens (25 and 200° C.), cracks in high temperature specimens (greater than or equal to 400° C.) propagated slowly and were more uniformly distributed in the top portion of the deformed micropillar, leading to the dilated cauliflower morphology. The slow crack propagation speed indicates enhanced compressive ductility at elevated temperature. As phase transformation toughening is less likely to operate at high temperatures, the enhanced plasticity of YSZ may have arose from deformation mechanisms, such as dislocation creep and/or grain boundary sliding. The high-density dislocations in flash-sintered specimens suggested that a dislocation power creep type of mechanism was highly likely. Meanwhile the small grains retained in the flash-sintered specimens may promote grain boundary sliding as a favorable deformation mechanism. Therefore, 400° C. was concluded to be the brittle-to-ductile transition temperature for flash-sintered YSZ, a much lower value than reported for conventionally sintered or single crystal YSZ systems (about 800° C.).

The apparent elastic moduli of tested YSZ were lower than the theoretical values (210 GPa) at all test temperatures. It is well known that the underestimation of elastic modulus in microcompression tests can be attributed to taper angle of the micropillars, misalignment between the tips and micropillars, and stress concentration on the top surface of the micropillars. Taking the underestimation into consideration, it is still surprising that the apparent elastic modulus of the flash-sintered 3YSZ increased with temperature and reached a maximum at 400° C. (FIG. 3, Image (i)). This is because the dominant phase of 3YSZ at room temperature is metastable tetragonal phase of zirconia and the elastic modulus of tetragonal phase is known to be lower than that of monoclinic and cubic phase. When temperature increases, an increasing portion of tetragonal zirconia undergoes transformation to stable tetragonal and cubic phase, which may lead to the slight increase of the apparent elastic modulus. This is also because ceramic materials retaining superelasticity usually exhibit lower elastic modulus due to the strain burst. It follows that the larger elastic modulus observed at elevated temperatures is an indication of suppression of the martensitic phase transformation due to thermodynamically reinforced stability of tetragonal phase. The total free energy change for martensitic transformation per unit volume ($\Delta U_0$) can be expressed as, $$\Delta U_0 = \Delta U_c + \Delta U_e + \Delta U_s - \Delta U_I \quad (2)$$

where $\Delta U_c$ is the chemical free energy change, $\Delta U_e$ is the elastic energy change associated with volume expansion of tetragonal zirconia constraint by matrix, $\Delta U_s$ is the interface energy change (negligible), and $\Delta U_I$ is the change in free energy associated with an external applied stress. This mechanical term should be larger than the first three terms on the right-hand side for martensitic transformation to occur. When the chemical free energy term ($\Delta S_m(M_s-T)$) and additional free energy change ($\Delta S_m(M_s-T_o)$) due to the presence of dopant are taken into account, the total free energy change as a function temperature is given, $$\Delta U_0 = \Delta S_m(M_s-T) - \Delta U_I \quad (3)$$

where $\Delta S_m$ is entropy change associated with martensitic transformation and $M_s$ is the martensitic start temperature. When $M_s=T$, spontaneous martensitic transformation takes place without external stress. As test temperature increases, Eq. (3) shows that the chemical energy change also increases (note that the entropy term is a negative value), thereby requiring larger mechanical term to overcome free energy barrier for martensitic transformation to occur.

The higher temperature (T>400° C.) weakens the interatomic bonds and thus reduces the elastic modulus, and high-density flash-sintered dislocations significantly contribute to the plasticity of 3YSZ as manifested by the increasing critical strain to nearly 7.5% before the observation of cracks at 600° C. In summary, the elastic modulus, critical strain and fracture behavior of flash-sintered 3YSZ at each test temperature indicated that 400° C. was the temperature beyond which the inelastic deformation mechanism of the flash-sintered YSZ changes prominently. Therefore, Zone 1 in FIG. 3, Image (i), corresponds to a transformation toughening dominated region below 400° C., whereas Zone 2 was associated to dislocation activity and presumably a grain boundary sliding dominant region above 400° C.

An indirect way to confirm martensitic transformation is to check the existence of reverse transformation. As shown in FIG. 4, Images (a)-(e), a significant amount of recoverable strain was observed during partial unloading owing to reverse transformation at room temperature. Furthermore, hysteresis loops appeared as strain increased. The area of the hysteresis loop tended to increase as stress and strain both increased. The appearance of hysteresis loops may be attributed to reverse transformation and reopening of closed pores in the flash-sintered 3YSZ. The micropillar after the cyclic loading test experienced 1% plastic strain, but still did not exhibit cracks as can be seen in FIG. 4, Image (b). It is worth mentioning that the stress-strain curves showed stronger linearity as the cyclic compression tests were conducted on the same micropillar. The stress-strain curve for the second monotonic test showed the highest linearity compared to the cyclic loading and the first monotonic compression test. This implied that martensitic transformation began to concede as consecutive compression tests were carried out on the same micropillar because part of the transformed monoclinic phase did not revert to tetragonal as the load on the micropillar was removed. Cyclic loading tests at 400° C. showed significantly less recoverable strain than the room temperature tests due primarily to the lack of transformation toughening, but the hysteresis loop remained visible presumably due to reopening of the microcracks and pores. An increase of crack density and slow crack propagation seemed to prevent the micropillars from undergoing brittle fractures and the micropillar achieved a residual strength of 1.5 GPa. Furthermore, stress relaxation measured during the holding segment (1 s for cycles) was observed at both room temperature and 400° C. Room temperature tests exhibited the same amount of stress relaxation during holding regardless of the overall strain. The formation of new microcracks and strain energy reduction in the micropillar may have resulted in the stress relaxation at room temperature. On the other hand, a significant increase of stress relaxation (the absolute value of stress reduction) was observed at 400° C. and the stress relaxation increased as the micropillar underwent plastic flow. Stress relaxation at high temperature is normally due to high temperature and stress induced-sintering and closure of pores. However, this mechanism is less likely at the low temperature (400° C.). Thus, stress relaxation taking place at 400° C. may be mainly contributed by a thermally activated inelastic process such as the effect of grain boundary sliding, and/or diffusional creep of dislocations generated during the ultra-fast flash sintering process. Another possible explanation is transient dislocation movement during the holding segment triggered by dislocation gliding, which is more likely to happen at elevated temperatures. Thus, the observation of stress relaxation may indicate that the dislocation activity contributed to deformability of flash-sintered 3YSZ together with grain boundary sliding and/or diffusion induced-inelastic mechanism above 400° C. The proposed relaxation mechanisms were all thermally activated phenomenon and time is an important variable. To better understand the inelastic mechanism activated at elevated temperature, systematic strain rate jump microcompression tests are needed in future studies.

Thus, this disclosure describes an in situ study on the mechanical behavior of flash-sintered YSZ performed inside an SEM at elevated temperatures of up to 600° C. At room temperature, YSZ micropillars sustained very high strain (about 8%) compared with its bulk counterpart (about 2%) due to stress-induced martensitic transformation toughening. However, the micropillars fractured catastrophically after the nucleation of cracks. In comparison, a brittle-to-ductile transition of fracture mode was observed at 400° C. in flash-sintered YSZ, much lower than the about 800° C. reported in conventional bulk YSZ. The enhanced plasticity at elevated temperatures was due to the transition from phase transformation toughening to dislocation creep, as the dominant inelastic deformation mechanism due to the existence of high density of dislocations in flash-sintered YSZ and/or to early initiation of grain boundary sliding owing to nanosized grains. This study provides the first evidence of superior mechanical properties of flash-sintered ceramic materials, using in situ nanomechanical testing technique at elevated temperatures, and provides an important way to fundamentally understand the densification and mechanical properties of ceramic materials.

Thus it is an objective of this disclosure to describe a method of increasing the deformability of a ceramic material. The method includes providing a nanocrystal line powder of a ceramic material, making a compact of the powder, and subjecting the compact to flash sintering by applying an electric field and thermal energy. An example of a ceramic material suitable for use in the method of this disclosure is, but not limited to, yttria-stabilized zirconia.

It is another objective of this disclosure to disclose a ceramic material with enhanced deformability as described above. A non-limiting example of such a ceramic material is yttria-stabilized zirconia.

Those skilled in the art will recognize that numerous modifications can be made to the specific implementations described above. The implementations should not be limited to the particular limitations described, as other implementations may be possible. As examples, though the investigations were performed on micropillars of 3YSZ, the teachings of the disclosure are applicable to other forms of compacts and materials other than 3YSZ, including zirconia stabilized by different amounts and different types of stabilizers. Therefore, the scope of the invention is to be limited only by the following claims.

The invention claimed is:

1. A ceramic material in the form of a compact formed by a method comprising:

making the compact of a nanocrystalline powder of the ceramic material, wherein the ceramic material is yttria-stabilized zirconia; and sintering the compact to increase the density thereof and simultaneously applying to the compact an electric field that is sufficiently high to introduce dislocations into the ceramic material of the compact;

wherein the dislocations are introduced into the ceramic material to have a sufficiently high dislocation density in grains of the ceramic material so that the compact exhibits a plastic deformation of greater than 2% to at least 8% true strain at temperatures of up to 600° C.;

wherein the dislocation density of the dislocations introduced into the grains of the ceramic material is $2\times10^{12}$ $m^{-2}$ to $3\times10^{12}$ $m^{-2}$; and wherein the sintered yttria-stabilized zirconia has grains with an average size of about 0.87 μm to about 1 μm and subgrains that have an average size of about 15% to about 20% of the average size of the grains.

2. The ceramic material of claim 1, wherein the sintered yttria-stabilized zirconia has an average grain size of about 870 nm and the subgrains have an average size of about 160 nm.

3. The ceramic material of claim 1, wherein the ceramic material has a transformation toughening dominated region below 400° C., and exhibits dislocation activity above 400° C.

4. The ceramic material of claim 1, wherein the electric field is greater than 15 V/cm.

5. The ceramic material of claim 1, wherein the yttria-stabilized zirconia has a dominant phase of the tetragonal phase of zirconia.

6. The ceramic material of claim 1, wherein the density of the compact is at least 98% of theoretical density.

7. The ceramic material of claim 1, wherein the plastic deformation of the compact is greater than 4% to at least 8% true strain at temperatures of up to 600° C.

8. The ceramic material of claim 1, wherein the plastic deformation of the compact is greater than 2% to at least 8% true strain at temperatures of up to 400° C.

9. The ceramic material of claim 1, wherein the plastic deformation of the compact is greater than 4% to at least 8% true strain at temperatures of up to 400° C.

* * * * *